United States Patent [19]
Lewis

[11] 3,777,483
[45] Dec. 11, 1973

[54] FUEL CONTROL APPARATUS FOR GAS TURBINE ENGINE

[75] Inventor: Geoffrey Lewis, Solihull, England

[73] Assignee: Joseph Lucas (Industries) Limited, Birmingham, England

[22] Filed: Mar. 30, 1972

[21] Appl. No.: 239,584

[30] Foreign Application Priority Data
Apr. 13, 1971 Great Britain..................... 9,270/71

[52] U.S. Cl.................. 60/39.28 R, 60/241, 60/243
[51] Int. Cl. ............................................. F02c 9/08
[58] Field of Search.................. 60/39.28, 261, 241, 60/243

[56] References Cited
UNITED STATES PATENTS
| | | | |
|---|---|---|---|
| 3,316,712 | 5/1967 | Tyler............................ | 60/39.28 R |
| 3,630,029 | 12/1971 | Smith............................ | 60/39.28 R |
| 3,648,460 | 3/1972 | Johnson........................ | 60/39.28 R |

Primary Examiner—Clarence R. Gordon
Attorney—John C. Holman et al.

[57] ABSTRACT

A fuel control apparatus for a gas turbine engine reheat system having first, second and third burners has first, second and third variable metering devices for controlling fuel flow to the respective burners. A control member for the first device is responsive to a first engine operating parameter and the control members for the second and third devices are responsive to the position of the first device control member and also to second and third engine operating parameters. First, second and third throttle valves are situated downstream of the first, second and third metering devices respectively. The second and third throttle valves are responsive to the pressure downstream of their associated metering devices, and the first valve is responsive to both the aforesaid downstream pressures, whereby the fuel pressures delivered to the burners are substantially equal.

32 Claims, 5 Drawing Figures

FUEL CONTROL APPARATUS FOR GAS TURBINE ENGINE

This invention relates to a fuel control apparatus for a gas turbine engine reheat system which includes a plurality of burners.

According to the invention a fuel control apparatus for a reheat system of the foregoing kind comprises a first variable metering orifice including a control member movable to control fuel flow to a first reheat burner in accordance with a first engine operating parameter, second and third variable metering orifices to control fuel flow to second and third reheat burners respectively, said second and third orifices each including a control member movable in response to the position of the control member of the first metering orifice and also in response to second and third engine operating parameters and throttles between the metering orifices and their associated burners, the throttle associated with the first metering orifice being responsive to a first servo pressure dependent on the pressures downstream of both the second and third metering orifices, and the throttles respectively associated with the second and third metering orifices being responsive to second and third servo pressures respectively dependent on the pressures downstream of the associated metering orifices.

Examples of fuel control apparatus according to the invention will now be described with reference to the accompanying drawings, in which.

Figure 1:
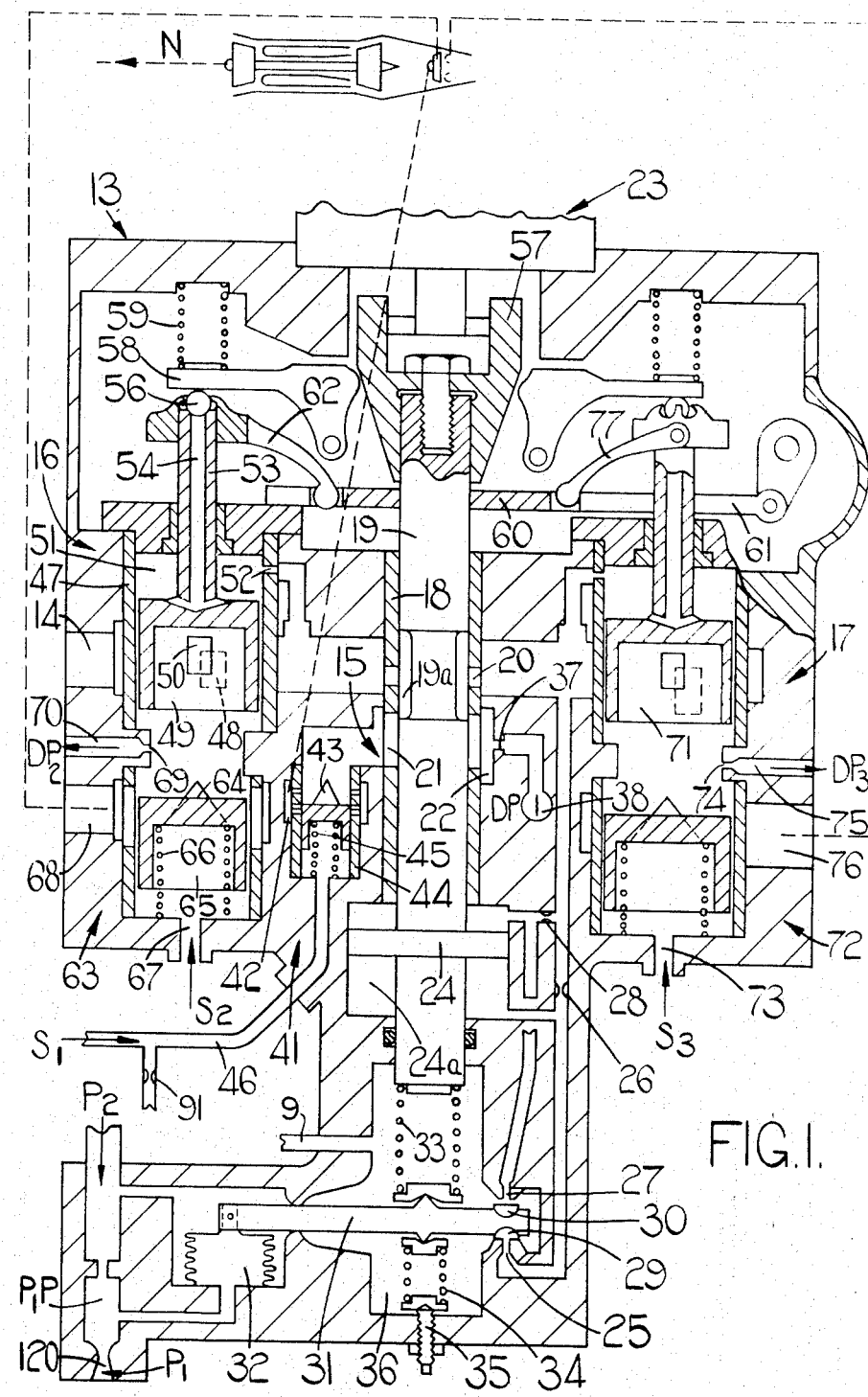
FIG. 1 is a diagram of a part of one form of apparatus.

Referring first to FIGS. 1 to 4, the apparatus has a centrifugal vapour core fuel pump 10 driven by the engine. Pump 10 is of the kind in which fuel delivery is controlled by a throttle responsive to pump delivery pressure and to a servo pressure signal applied via a passage 12 to oppose the pump delivery pressure. This servo pressure signal is derived in a manner later to be described.

A metering assembly, shown generally at 13, has an inlet 14 connected to the outlet of pump 10 and includes three variable metering devices 15, 16, 17 arranged in parallel to control fuel flow to a primary burner, a gutter and a collander respectively of the engine reheat system.

Device 15 comprises a sleeve 18 within which a valve spool 19 is slidable and rotatable. Sleeve 18 has ports 20 which communicate with inlet 14 and also has a further port 21 which communicate with an annular passage 22. Valve spool 19 includes a recess 19a by means of which fuel can flow between ports 20, 21. Valve spool 19 is rotatable by an electric actuator 23 responsive to a temperature $T_1$ at the engine air intake. Valve spool 19 includes a piston portion 24 slidable in a cylinder 24a and subjected on opposite sides to servo pressures derived from the pressure at the inlet 14. One side of piston 24 communicates via a valve 25 with a chamber 36 and also via a resistrictor 26 with inlet 14. The other side of piston 24 communicates via a valve 27 with chamber 36 and also via a restrictor 28 with inlet 14. Valves 25, 27 have associated half ball closure members 29, 30 mounted on a single control lever 31 movable by a bellows 32 in response to a pressure $P_1P$ derived from the delivery pressure $P_2$ of the engine compressor and the compressor inlet pressure $P_1$; pressure $P_1P$ being proportional to pressure $P_2$ when a downstream orifice 120 is choked.

A spring 33 is engaged between lever 31 and the adjacent end of spool 19, and a spring 34 is engaged between lever 31 and an adjustable stop 35 on the assembly 15. Chamber 36 communicates with a low pressure drain 9.

The pressure $DP_1$ in the annular passage 22 surrounding ports 21 communicates via a restrictor 37 and a passage 38 with a chamber 39 in a servo pressure control arrangement, shown generally at 40. Annular passage 22 also communicates via a throttle valve 41 and an annular passage 42 with the primary burners of the reheat system. Throttle valve 41 includes a metering orifice 43 and a piston control element 44 biased against the pressure in passage 22 by a spring 45 and by a first servo pressure signal $S_1$ obtained, in a manner later to be described, from the servo control arrangement 40 and supplied via a passage 46.

Device 16 includes a sleeve 47 formed with a port 48 which communicates with inlet 14. A piston control element 49 (shown in greater detail in FIGS. 3 and 4) is slidable and rotatable in sleeve 47 and includes a through port 50 which combines with portion 48 to provide a variable metering orifice. Element 49 defines within sleeve 47 a chamber 51 which communicates with inlet 14 via a restrictor 52. Element 49 includes a stem 53 having an axial bore 54 which communicates with chamber 51. A ball closure member 56 is captive on stem 53 and is operable to shut off the end of bore 54.

Valve spool 19 of device 15 has secured thereto a three-dimensional cam 57. A cam follower 58 is biased into engagement with cam 57 by a spring 59 and is also engageable with ball closure member 56. An edge cam 60 is rotatable by a linkage 61 in accordance with the position of a power demand control for the engine. A cam follower 62 engages cam 60 and is secured to stem 53 to rotate control element 49 in accordance with the position of the said power demand control.

Downstream of a device 16 is a throttle valve 63 including a metering orifice 64 and a piston control element 65 biased against the pressure downstream of device 16 by a spring 66 and by a second servo pressure signal $S_2$ obtained from the servo control arrangement 40 and supplied via a passage 67. Downstream of metering orifice 64 is a passage 68 through which fuel can reach the gutters of the reheat system. The pressure $DP_2$ immediately downstream of device 16 is supplied via a restrictor 69 and a passage 70 to the arrangement 40 to control the servo pressure signal $S_2$ in a manner later to be described.

Device 17 is identical with device 16, having a piston control element 71 axially and rotatably positioned by cams 57 60 respectively. An associated throttle valve 72 is responsive to a third servo pressure signal $S_3$ which is supplied via a passage 73 from control arrangement 40 and is dependent on the pressure $DP_3$ immediately downstream of device 17. Pressure $DP_3$ is supplied via a restrictor 74 and passage 75 to the arrangement 40. The downstream side of throttle valve 72 communicates via a passage 76 with a collander of the engine reheat system.

Cam follower 62 and an identical cam follower 77 associated with device 17 are biased into engagement with cam 60 by means of a rod 78 interconnecting followers 62, 77 and a plurality of spring washers 79 mounted on the rod.

Figure 2:
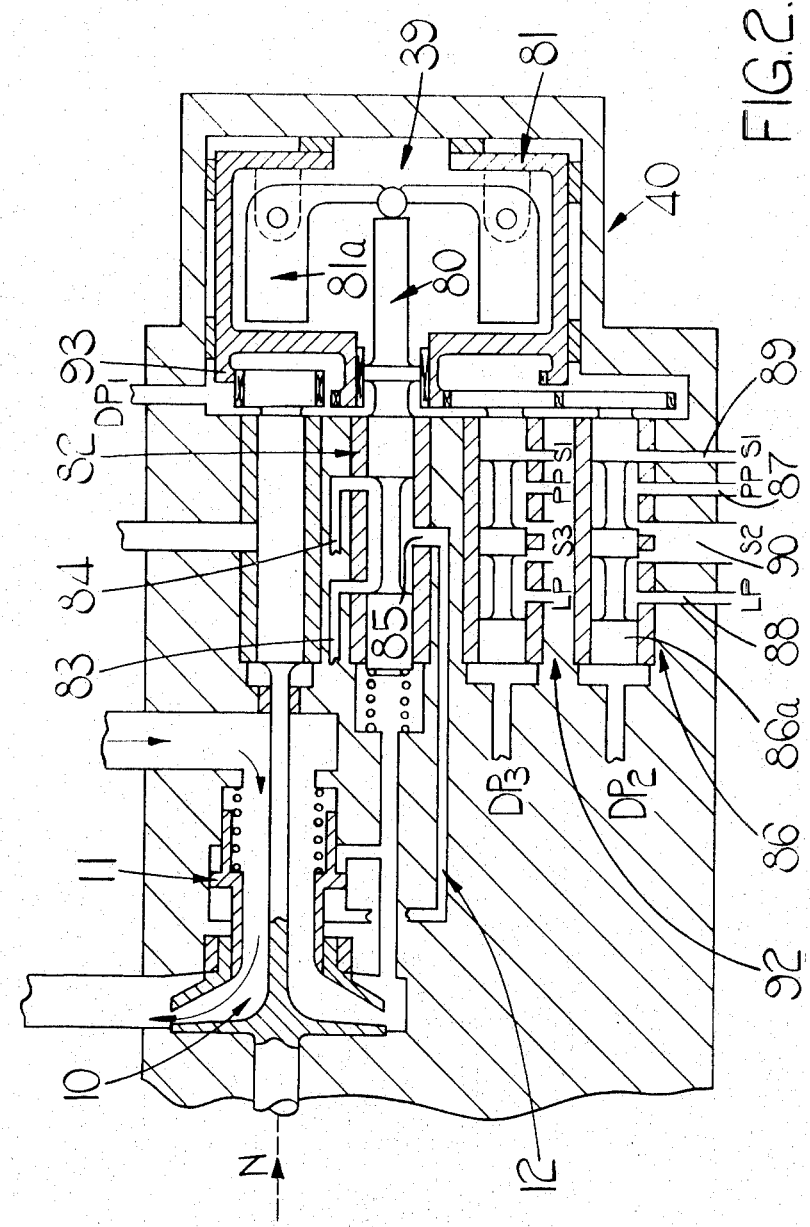
FIG. 2 is a diagram of another part of said one form of apparatus.
Figure 3:
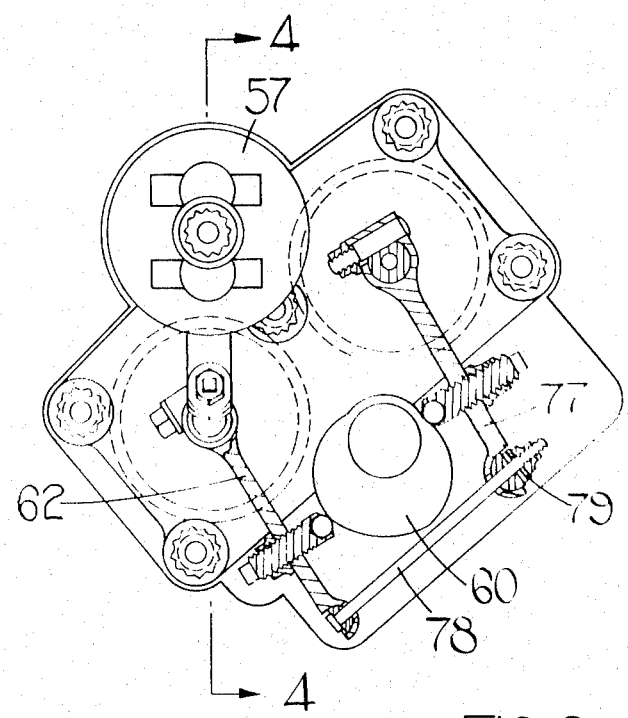
FIG. 3 is a detail of a part of the apparatus of FIG. 1.
Figure 4:
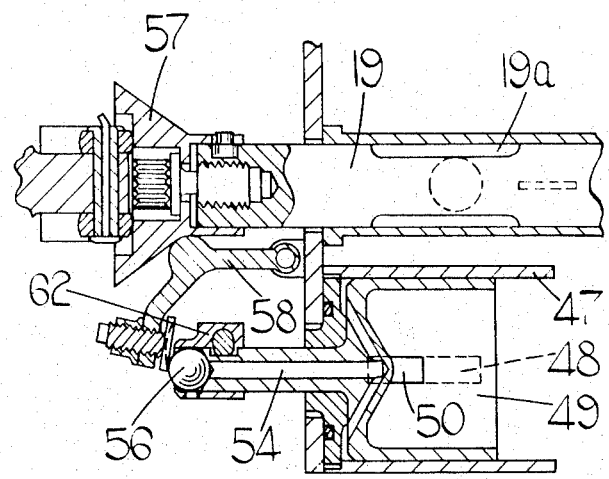
FIG. 4 is a section on line 4—4 in FIG. 3.

Arrangements 40 has a first valve spool 80 urged in one direction by the delivery pressure of pump 10 and in the opposite direction by the pressure $DP_1$ in chamber 39 and by a governor mechanism 81 responsive to engine speed. Valve spool 80 is slidable within a sleeve 82 having a port 83 to which is applied a fluid from a high pressure source. This fluid is conveniently the fuel supplied by a high pressure pump for the engine. A further port 84 in sleeve 82 communicates with a low pressure drain, and a port 85, intermediate ports 83, 84 communicates with passage 12. An increase in the delivery pressure $P_P$ of pump 10 causes valve spool 80 to be urged to the right, as seen in FIG. 2, shutting off port 83 and opening port 84. The pressure in passage 12 thus falls and throttle 11 moves to reduce fuel flow and hence delivery pressure of pump 10. An increase in engine speed or a rise in pressure $DP_1$ downstream of variable metering device 15, similarly causes the delivery pressure of pump 10 to be increased. Pump delivery pressure $P_P$ at inlet 14 is thus varied to maintain the difference between pressures $DP_1$ and $P_p$ substantially constant for a given engine speed, this pressure difference being variable with engine speed. The weights $81a$ of governor mechanism 81 have a relatively low specific gravity, whereby, when a denser fuel is used, the effect of engine speed on valve spool 80 is reduced.

Servo control arrangement 40 also includes a valve 86 having a spool $86a$ responsive to pressure $DP_1$ and to the opposing pressure $DP_2$ obtained as described above from metering assembly 13. Pump delivery pressure $P_p$ is applied to an inlet 87 of valve 86. Outlets 88, 89 respectively communicate with a low pressure drain and with passage 46 in metering assembly 13. Spool $86a$ includes a portion movable with respect to a further outlet 90 to provide the servo pressure $S_2$, outlet 90 communicating with passage 67 in metering assembly 13. A fall in pressure $DP_2$ causes spool $86a$ to move so as to increase the value of pressure $S_2$ and thereby to urge control element 65 to reduce metering orifice 64, restoring pressure $DP_2$. A rise in pressure $DP_1$ moves spool $86a$ in the same direction, causing pressure $DP_2$ to rise to the same value as pressure $DP_1$. Outlet 89 is normally shut and communicates with passage 46 and also via a restrictor 91 with a low pressure drain. If a rise in pressure $DP_2$ or a fall in pressure $DP_1$ causes a change in pressure $S_2$ which is insufficient to bring $DP_2$ equal to $DP_1$ then outlet 89 opens. The resultant increase in servo pressure $S_1$ causes throttle 41 to close so as to tend to restore pressure $DP_1$ to the level of $DP_2$. In a similar manner an increase and decrease in pressures $DP_1$ and $DP_2$ respectively moves spool $86a$ in a direction to restore the original pressures. The arrangement is such that pressures $DP_1$ and $DP_2$ are maintained substantially equal to each other.

Servo control arrangement 40 also includes a further spool valve 92, substantially identical to valve 86, but responsive to pressures $DP_1$ and $DP_3$. Spool valve 92 operates in the same way as valve 86 to maintain pressure $DP_3$ equal to pressures $DP_1$ and $DP_2$. The spools of valve 86, 92 are driven by a gear train 93 powered ultimately by the engine.

In use, fuel is supplied from pump 10 to the metering assembly 13, and passes via device 15 and throttle valve 41 to the passage 42. A separate shut-off cock and ignition arrangement (not shown) prevent fuel from reaching the primary burners unless reheat is selected. Fuel flow to the primary burners is controlled by axial movement of valve spool 19 in response to pressures $P_2$ and $P_1P$. Spool 19 is rotated by actuator 23 in accordance with temperature at the engine compressor intake.

Rotation of spool 19 has no effect on primary flow but positions the three-dimensional cam 57. Cam 57 is formed with a series of profiles which correspond to functions of $T_1$ for a number of values of $P_2$.

Control element 49 is urged upwards, as seen in FIG. 1, in a direction to reduce fuel flow, by the pressure downstream of the metering orifice formed by ports 48, 50. This upward movement is resisted by the pressure in chamber 51. Pressure in chamber 51 is controlled by ball closure member 56. If ball 56 is permitted to open by cam follower 58, pressure in chamber 51 falls and element 49 moves to reduce fuel flow. With ball 56 shut, pressure in chamber 51 is greater than that downstream of ports 48, 50, and element 49 moves to increase fuel flow. Element 49 thus acts as a follow up servo piston responsive to the position of cam follower 58, which is in turn dependent on the value of $P_2$ and the function of $T_1$ derived from the cam 57. Element 49 is also rotated in response to the position of the power demand control for the engine, port 50 being moved towards or away from, register with port 48 as element 49 is rotated. Element 71 of device 17 operates, in the same way as element 16, to control fuel flow to the reheat collander.

In use, the output pressure of the pump 10 is controlled as previously described to maintain pressure $DP_1$ substantially constant for a given engine speed and fuel density, and pressures $DP_2$ and $DP_3$ are maintained substantially equal to $DP_1$. As a result, fuel flows to all the reheat burners are responsive to engine speed, N, flow to the primary burners being dependent therefore on the values N and $P_2$. Flows to the gutter and collander are dependent on the values N and $P_2$ obtained as a result of axial position of spool 19, on the value of functions of $T_1$ obtained from cam 57, and on the value of $\Theta$ obtained via cam 60.

Figure 5:
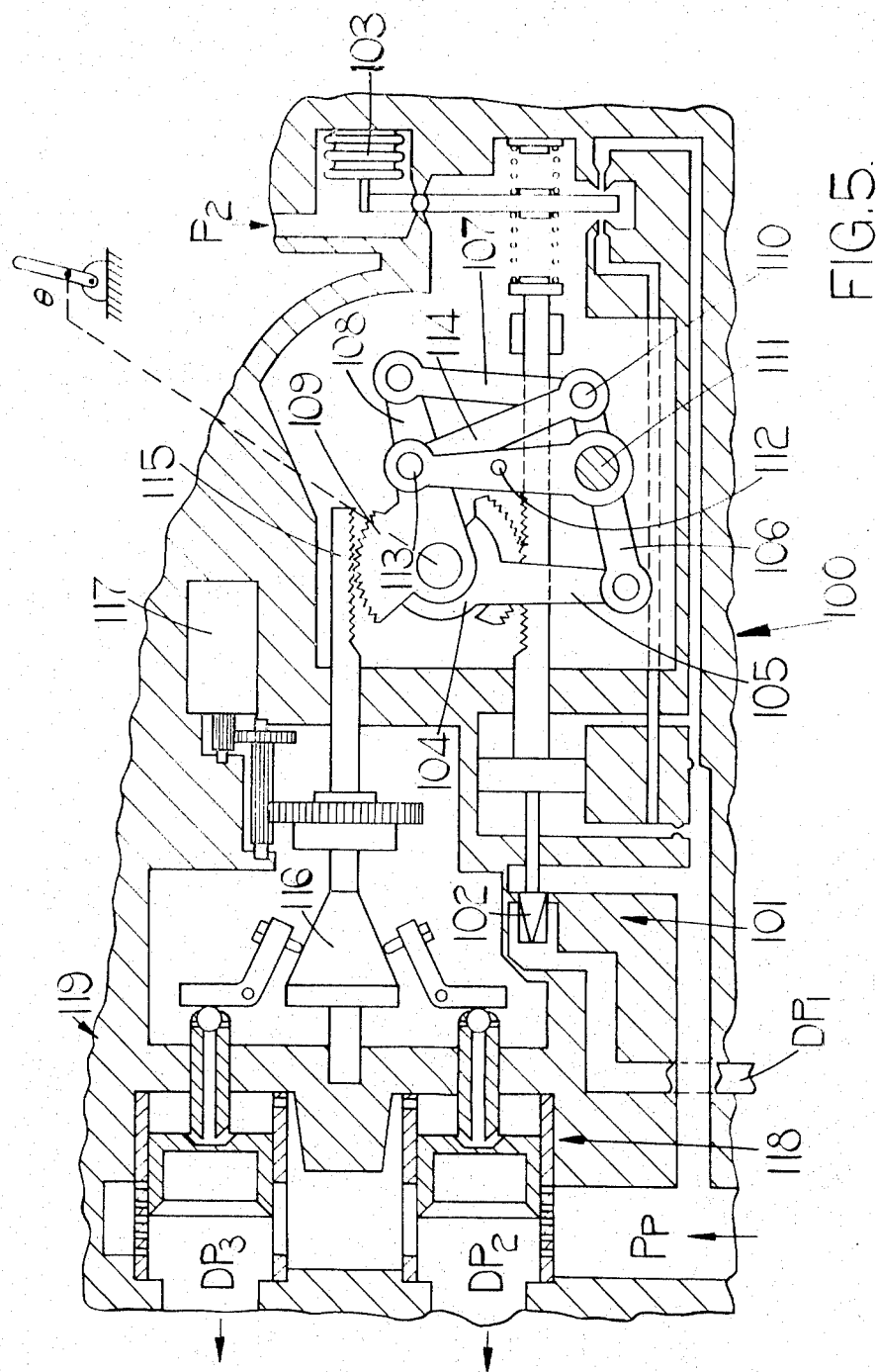
FIG. 5 is a diagram of an alternative form of the apparatus of FIG. 1.

The alternative form of metering assembly 100 shown in FIG. 5 corresponds to the metering assembly 13 in FIG. 1, but does not show the throttle valves downstream of the metering devices.

The metering orifice 101 for the primary burner has a closure member 102 positioned axially, as before, by servo pressures controlled by a bellows 103 responsive to compressor delivery pressure $P_2$. The axial position of closure member 102 is transmitted via a rack and quadrant 104 to a quadrilateral linkage formed by arms 105, 106, 107 and 108 all of which have relative pivotal movement.

Arm 108 has a quadrant 109 coaxial with quadrant 104. In such an arrangement rotation of quadrant 109 in response to rotation of quadrant 104 is dependent on the path in which the pivot 110 between arms 106, 107 is contrained to move. A spindle 111 is rotatable in response to position $\Theta$ of the engine power demand control. A crank 112 carried by spindle 111 provides a movable centre 113 about which pivot 110 is constrained to move by a link 114.

Quadrant 109 is engaged by rack 115 upon which is journalled a three dimensional cam 116, which corresponds to cam 57 in FIG. 1. Cam 116 is rotatable by an actuator 117 responsive to engine air intake temperature $T_1$. Metering devices 118, 119, for controlling fuel flow to the gutter and collander respectively of the reheat system, are resonsive to the axial and angular positions of cam 116.

In use metering orifice 101 is controlled in accordance with the value of $P_2$ and also, by virtue of control arrangement 40 with the value of N. Fuel flows to the gutter and collander via orifices 118 and 119 respectively are also controlled in accordance with the product of $P_2$ and O, obtained via the quadrilateral linkage, and modified in accordance with $T_1$ by the cam 116.

I claim:

1. A fuel control apparatus for a gas turbine engine reheat system which includes a plurality of burners, comprising a first variable metering orifice including a control member movable to control fuel flow to a first reheat burner in accordance with a first engine operating parameter, second and third variable metering orifices to control fuel flow to second and third reheat burners respectively, said second and third orifices each including a control member movable in response to the position of the control member of the first metering orifice and also in response to second and third engine operating parameters and throttles between the metering orifices and their associated burners, the throttle associated with the first metering orifice being responsive to a first servo pressure dependent on the pressures downstream of both the second and third metering orifices, and the throttles respectively associated with the second and third metering orifices being responsive to second and third servo pressures respectively dependent on the pressures downstream of the associated metering orifices.

2. An apparatus as claimed in claim 1 in which said first variable metering orifice comprises a first valve spool axially slidable to vary the size of said first metering orifice.

3. An apparatus as claimed in claim 2 which includes a piston responsive to first and second servo operating pressure dependent on the engine compressor pressures, said piston being operatively connected to said first valve spool.

4. An apparatus as claimed in claim 3 which includes a pilot valve arrangement responsive to said compressor pressures to control the relative magnitudes of said servo operating pressures and means connecting said first valve spool to said pilot valve arrangement so as to urge the latter to vary said servo operating pressure to oppose movement of said first valve spool.

5. An apparatus as claimed in claim 4 which includes a bellows unit responsive to an air pressure signal derived from the engine compressor, and said pilot valve arrangement includes a pair of closure members movable by said bellows unit to vary said first and second servo operating pressures respectively.

6. An apparatus as claimed in claim 1 in which the control members for said second and third orifices respectively comprise first and second piston elements slidable in response to said second operating parameter.

7. An apparatus as claimed in claim 6 in which each said second and third orifice includes a ported sleeve within which the associated piston element is movable.

8. An apparatus as claimed in claim 8 in which each said piston element includes a port which co-operates with the port in the associated sleeve to define said second and third variable metering orifices.

9. An apparatus as claimed in claim 6 which includes means for rotating the control member of said first metering orifice in response to said second engine operating parameter.

10. An apparatus as claimed in claim 9 which includes a three-dimensional cam secured to the first metering orifice control member for movement therewith, and first and second cam follower elements movable by said cam and respectively coacting with said piston elements to vary the sliding positions thereof.

11. An apparatus as claimed in claim 10 in which said piston elements are respectively responsive to third and fourth servo operating pressures, and each said piston element includes valve means responsive to the relative positions of the piston element and the associated cam follower element to vary the magnitude of the corresponding servo operating pressure.

12. An apparatus as claimed in claim 6 which includes means for rotating said piston elements in response to said third operating parameter.

13. An apparatus as claimed in claim 12 in which said piston element rotating means comprises an edge cam rotatable in response to said third operating parameter, and two cam follower assemblies biased into engagement with said edge cam and secured to said respective piston elements.

14. An apparatus as claimed in claim 1 in which said second engine operating parameter comprises the temperature at the engine compressor intake.

15. An apparatus as claimed in claim 1 in which said third engine operating parameter comprises the position of of a power demand control for the engine.

16. An apparatus as claimed in claim 1 in which said throttles associated with said first, second and third metering orifices respectively include third, fourth and fifth piston elements.

17. An apparatus as claimed in claim 16 in which said third, fourth and fifth piston elements are respectively responsive to an increase in the pressures downstream of the associated metering orifices to open said throttles, and are also responsive to increases in said first, second and third servo pressure signals respectively to shut said throttles.

18. An apparatus as claimed in claim 17 which includes means for generating said first, second and third servo pressure signals.

19. An apparatus as claimed in claim 18 in which said servo pressure generating means comprises a second valve spool movable in response to the difference between the pressures downstream of the first and second metering orifices, and a third valve spool movable in response to the difference between the pressures downstream of the first and third metering orifices.

20. An apparatus as claimed in claim 19 in which said second servo pressure signal is responsive to the position of said second valve spool, an increase in the pressure downstream of said metering orifice or a decrease in the pressure downstream of said first metering orifice acting to decrease said second servo pressure signal.

21. An apparatus as claimed in claim 19 in which said third servo pressure signal is responsive to the position of said third valve spool, an increase in the pressure downstream of said third metering orifice or a decrease in the pressure downstream of said first metering orifice acting to decrease said third servo pressure signal.

22. An apparatus as claimed in claim 19 in which said second and third valve spools are movable to increase said first servo pressure signal when the difference between the pressures downstream of the first and second metering orifices or the difference between the pressures downatream of the first and third metering orifices exceeds a predetermined value.

23. An apparatus as claimed in claim 1 which includes regulating means for maintaining the pressure drop across the first metering orifice substantially constant for any given engine speed.

24. An apparatus as claimed in claim 23 in which said regulating means comprises a fuel pump driven, in use, at a speed proportional to the speed of the engine, and valve means responsive to the delivery pressure of the pump, to the engine speed, and to the pressure downstream of said first metering orifice, to vary said pump delivery pressure.

25. An apparatus as claimed in claim 24 in which said valve means comprises a control valve responsive to a fourth servo pressure signal to vary the flow through the pump.

26. An apparatus as claimed in claim 25 in which said regulating means includes a fourth valve spool responsive to an increase in said pump delivery pressure to reduce said fourther servo pressure signal, and to a decrease in the pressure downstream of said first metering orifice or to an increase in engine speed to increase said fourther servo pressure signal.

27. An apparatus as claimed in claim 6 which includes a three-dimensional cam rotatable in response to said second engine operating parameter, and first and second cam-follower elements movable by said cam and respectively coacting with said piston elements to vary the sliding positions thereof.

28. An apparatus as claimed in claim 27 in which said piston elements are respectively responsive to third and fourth servo operating pressures, and each said piston element includes valve means responsive to the relative positions of the piston element and the associated cam follower element to vary the magnitude of the corresponding servo operating pressure.

29. An apparatus as claimed in claim 27 which includes means for moving said three-dimensional cam acially in accordance with the position of the control member of said first metering orifice and also in accordance with said third operating parameter.

30. An apparatus as claimed in claim 29 in which said means for axially moving said cam comprises a quadrilateral linkage having one arm movable about a first pivotal axis by movement of the control member of said first metering orifice, an arm adjacent said one arm and pivotally movable about said first pivotal axis to cause axial movement of said cam, and means for varying the locus of movement of second pivotal axis of said linkage in accordance with said third parameter, said second axis being opposite said first axis.

31. An apparatus as claimed in claim 30 in which said locus varying means comprises a crank rotatable about a third axis in accordance with said third parameter and a link interconnecting said second pivotal axis and the end of the crank remote from said third axis.

32. An apparatus as claimed in claim 30 which said arms of said linkage each include a gear sector centred about said first pivotal axis, said gear sectors meshing with respective racks which respectively coact with said first metering orifice control member and said three-dimensional cam.

* * * * *